(12) United States Patent
Stillman et al.

(10) Patent No.: US 8,068,585 B2
(45) Date of Patent: Nov. 29, 2011

(54) CHECKING OF BROADBAND NETWORK COMPONENTS

(75) Inventors: Scott Traynham Stillman, Peachtree City, GA (US); Scott Crandall Holt, Decatur, GA (US); Kenneth Wayne Chastain, Tucker, GA (US); Hong Thi Nguyen, Atlanta, GA (US); Senis Busayapongchai, Tucker, GA (US); Lisa Marie Birkenberger, Alpharetta, GA (US); Judson Barry Johnston, Marietta, GA (US); Eric Duron, Villa Rica, GA (US); Diana N. Gash, Tucker, GA (US); Homayoun Torab, Lawrenceville, GA (US); Harry Tang, Dunwoody, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 748 days.

(21) Appl. No.: 12/119,866

(22) Filed: May 13, 2008

(65) Prior Publication Data
US 2008/0212486 A1    Sep. 4, 2008

Related U.S. Application Data

(62) Division of application No. 10/611,464, filed on Jun. 30, 2003, now abandoned.

(60) Provisional application No. 60/450,189, filed on Feb. 25, 2003.

(51) Int. Cl.
*H04M 1/24* (2006.01)
*H04M 3/08* (2006.01)
*H04M 3/22* (2006.01)

(52) U.S. Cl. .................................. 379/27.01

(58) Field of Classification Search .................. 370/255; 379/27.01
See application file for complete search history.

(56) References Cited

U.S. PATENT DOCUMENTS

| 6,895,558 B1 | 5/2005 | Loveland |
| 2002/0095484 A1 | 7/2002 | Pagani et al. |
| 2004/0022237 A1* | 2/2004 | Elliott et al. ............ 370/356 |
| 2004/0165580 A1 | 8/2004 | Stillman et al. |

OTHER PUBLICATIONS

Stillman; U.S. Appl. No. 10/611,464, filed Jun. 30, 2003.
Stillman; Non-Final Rejection mailed May 16, 2008 for U.S. Appl. No. 10/611,464, filed Jun. 30, 2003.
Applicant Statement in IDS.
United States Patent and Trademark Office, "Non-final Office Action" issued in connection with U.S. Appl. No. 10/611,464, mailed Jun. 19, 2009 (7 pages).
United States Patent and Trademark Office, "Final Office Action" issued in connection with U.S. Appl. No. 10/611,464, mailed Dec. 3, 2008 (15 pages).

(Continued)

*Primary Examiner* — Alexander Jamal
(74) *Attorney, Agent, or Firm* — Hanley, Flight & Zimmerman LLC

(57) ABSTRACT

Systems and methods for checking broadband network components are provided in which an automated interactive system permits a field technician to check various conditions of a communication line or other broadband network components without the assistance of a support technician. While options to request assistance from a support technician are provided, the automated interactive system permits the field technician to perform various functions on a communication line without additional assistance, especially for routine tasks. The automated interactive system, therefore, removes efficiencies that may be associated with conventional approaches for checking broadband network components.

10 Claims, 13 Drawing Sheets

OTHER PUBLICATIONS

United States Patent and Trademark Office, "Non-final Office Action" issued in connection with U.S. Appl. No. 10/611,464, mailed May 16, 2008 (7 pages).

United States Patent and Trademark Office, "Restriction Requirement" issued in connection with U.S. Appl. No. 10/611,464, mailed Jan. 24, 2008 (7 pages).

* cited by examiner

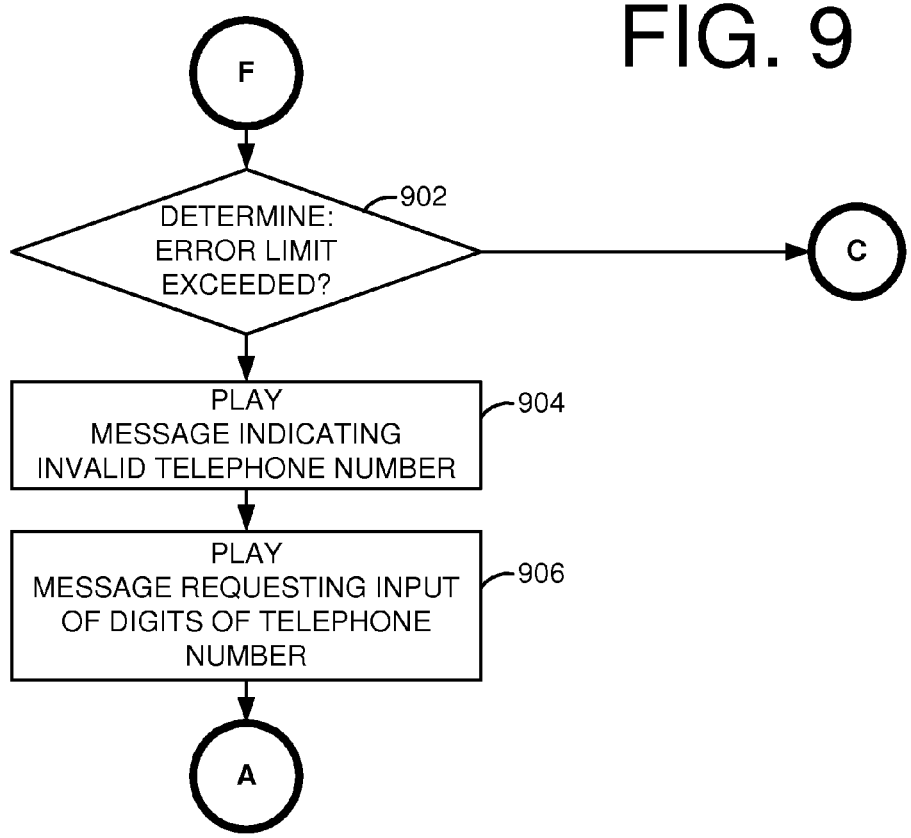
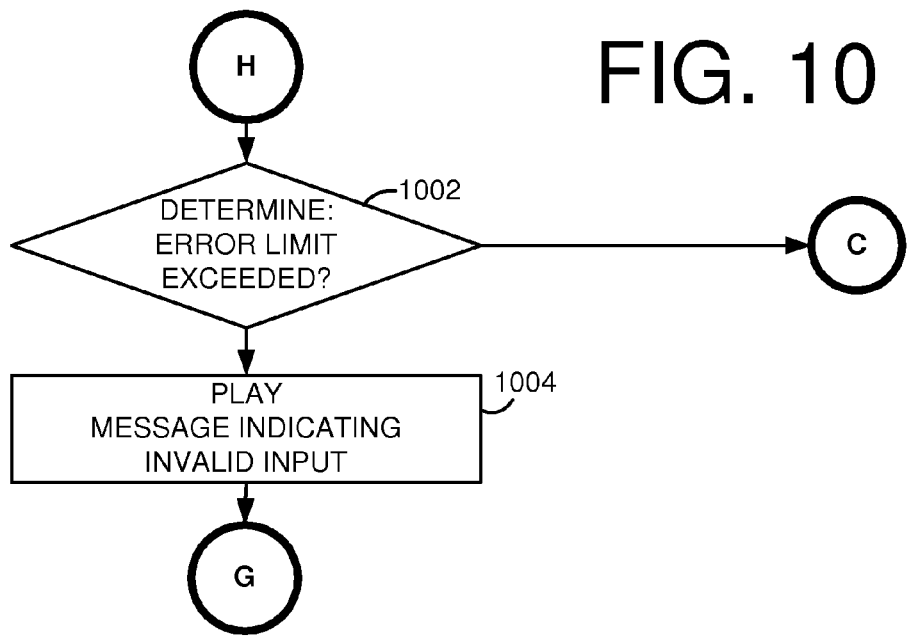

CHECKING OF BROADBAND NETWORK COMPONENTS

CROSS REFERENCE TO RELATED APPLICATIONS

This application is a divisional of U.S. application Ser. No. 10/611,464 filed Jun. 30, 2003, which claims priority to U.S. Provisional Application No. 60/450,189, filed Feb. 25, 2003, which are incorporated herein by reference in their entireties.

FIELD OF THE INVENTION

The present disclosure relates generally to communication networks and, more particularly, to checking of broadband network components.

BACKGROUND

In modern-day communication environments, which include digital subscriber line (DSL) systems, particular services often require a field technician to physically monitor a communication line from a fixed location. For example, in order to verify a DSL port, a field technician usually connects test equipment to the line and reads signals from the line using the test equipment. One example of this is shown in FIG. 1.

As shown in FIG. 1, the communication environment includes a public switched telephone network (PSTN) 160, a cellular network 134, and the Internet 122, which are communicatively coupled to each other. Additionally, the communication environment includes a central office 106, which has a switch 108 and a DSL access multiplexer (DSLAM) 112, which are configured to provide DSL services to customers. The switch 108 is coupled to the PSTN 160 through a communication line 124, thereby permitting communications between the PSTN 160 and the central office 106. Since communications between the cellular network 134, the PSTN 160, and the Internet 122 are known in the art, only an abridged discussion is provided below.

A customer location 162, which may be a home, may include both a plain old telephone system (POTS) telephone 158 and a DSL modem 154, thereby permitting both DSL communications and standard telephone services to the customer location 162. A splitter 104 couples the customer location 162 to a line 114, which is coupled to the DSLAM 112, which, in turn is coupled to the switch 108. The DSLAM 112 communicatively couples the central office 106 with an Internet service provider 118, thereby permitting access to the Internet 122 for the DSL customers.

While the splitter 104 is shown as a functional block located within the home, it should be appreciated that the splitter 104 may also represent one or more components within the home that properly route the DSL signals and the POTS signals to their respective endpoints (e.g., DSL modem, POTS phone, analog fax machine, etc.). In other implementations, the splitter may represent one or more components located outside of the home, which routes the DSL signals and POTS signals to their respective endpoints. In this regard, it should be appreciated that the splitter 104 may represent the various components used to route the DSL and POTS signals to and from the home and, also, to route DSL and POTS signals to and from the CO. Since many of these configurations are known in the art, further discussion of the splitter 104 is omitted here.

In such an environment, if verification of a DSL port is desired, then a field technician 102 is typically deployed to the customer location 162. Upon arriving at the customer location, the field technician 102 connects test equipment to the appropriate line components and calls a support technician at a DSL support group 140 for assistance in verifying the DSL port. This call may be placed using a cellular telephone (as shown in FIG. 1) or using a standard POTS phone. In either event, upon reaching a support technician, the field technician typically relays the field request (e.g., port verification request) to the support technician. The support technician then enters the request to a network management system (NMS) 144a, which is accessible by the DSL support group 140 through a user interface, such as, for example, Java™ Broadband Operating System (JBBOS) 212a. The NMS 144a, in turn, accesses the relevant information from an element database 164 and, with the accessed information, affects an element manager 148 to generate a command to the DSLAM 112. In response to the command, the DSLAM 112 cycles a signal on the line that is detectable by the field technician's test equipment.

As shown from the example of FIG. 1, the proper monitoring of a communication line often requires two technicians (both the support technician and the field technician), thereby occupying the time and resources associated with both technicians. This often results in an inefficient use of time and resources, especially if a routine test is being performed on the line.

In view of this inefficiency, a heretofore-unaddressed need exists.

SUMMARY

The present disclosure provides systems and methods for checking broadband network components.

Briefly described, in architecture, one embodiment of a system comprises an Interactive Voice Response Application (IVR application), a field application tool, a network management system (NMS), and a broadband network component. The IVR application receives an input from a field technician and automatically conveys the input to a field application tool. The field application tool receives the input from the IVR application and automatically conveys it to the NMS. The NMS receives the request and generates a command in response to the request. The command is transmitted over a communication line to the broadband network component, which receives the command and responds to the command.

The present disclosure also provides methods for checking broadband network components. In this regard, an embodiment of a method comprises the steps of receiving a request to affect a broadband network component. The request is received from a first system and automatically conveyed, preferably without human intervention, to a second system. The second system is configured to affect the broadband network component.

Other systems, methods, features, and advantages will be or become apparent to one with skill in the art upon examination of the following drawings and detailed description. It is intended that all such additional systems, methods, features, and advantages be included within this description.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

FIGS. 4 through 15 are flowcharts showing an embodiment of a process for remotely checking communication lines.

DETAILED DESCRIPTION OF THE PREFERRED EMBODIMENTS

Figure 1:
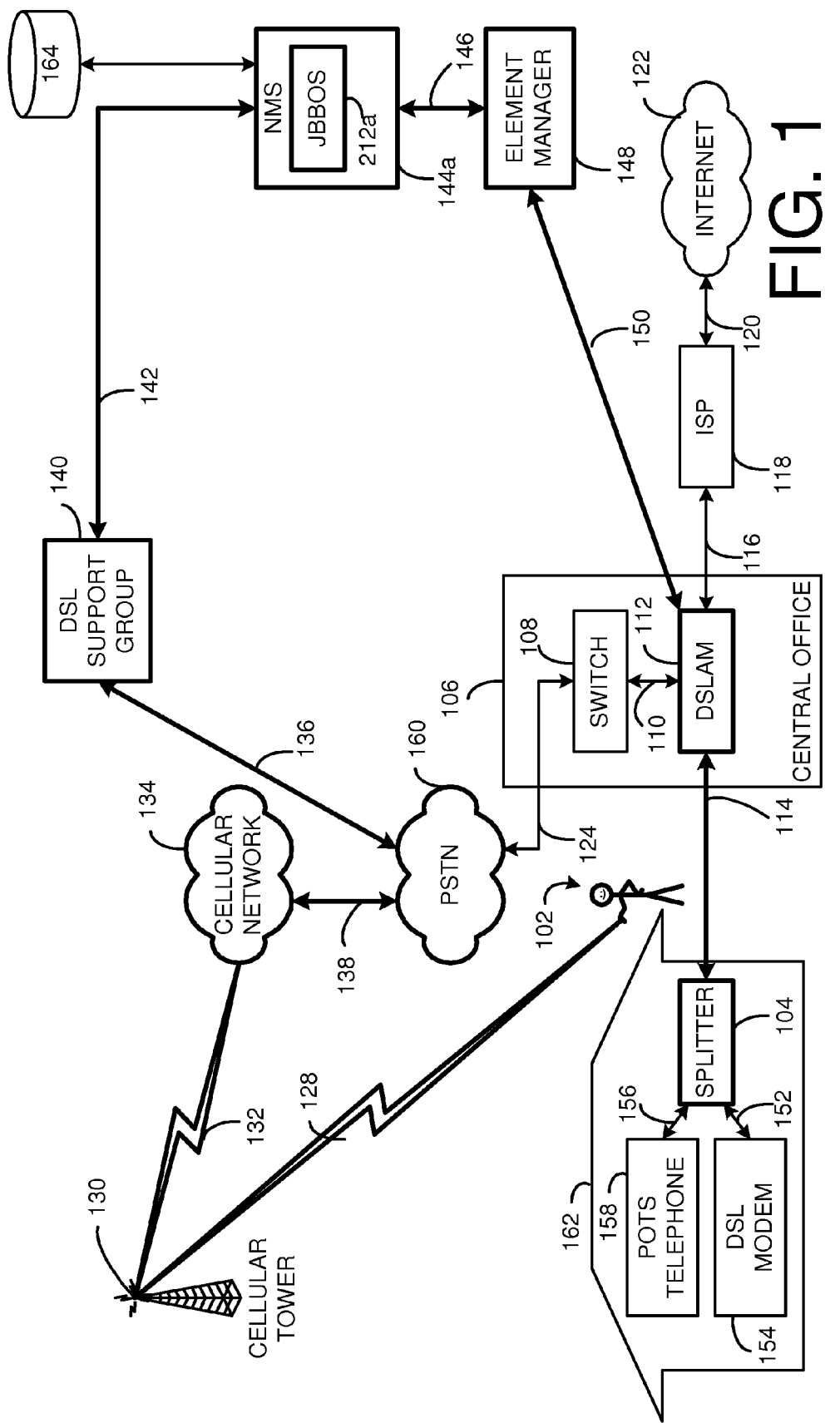
FIG. 1 is a block diagram showing an example communication environment of the prior art.

Reference is now made in detail to the description of the embodiments as illustrated in the drawings. While several embodiments are described in connection with these drawings, there is no intent to limit the invention to the embodiment or embodiments disclosed herein. On the contrary, the intent is to cover all alternatives, modifications, and equivalents.

In a broad sense, the embodiments described below permit line testing, in the context of broadband communications, without occupying the time and resources of two technicians. This is done, in one sense, by replacing a support technician with an automated interactive system. In some embodiments, the field technician interacts with the automated interactive system using a numeric keypad on the field technician's telephone. It should be appreciated that, in other embodiments, the field technician may interact with the automated interactive system through other interfaces, such as, for example, by using speech recognition algorithms, which may be custom-tailored to particular working environments.

For embodiments employing the numeric keypad of a telephone, the field technician's telephone transmits dual-tone multi-frequency (DTMF) signals to the automated interactive system, which then converts the DTMF signals into requests that are recognizable by a network management system (NMS). Upon receiving the requests, the NMS affects an element manager to generate commands. The commands affect the line, and the resulting effect is detectable by the field technician's test equipment. By providing an automated approach to many routine tasks, the automated interactive system increases efficiency.

Figure 2:
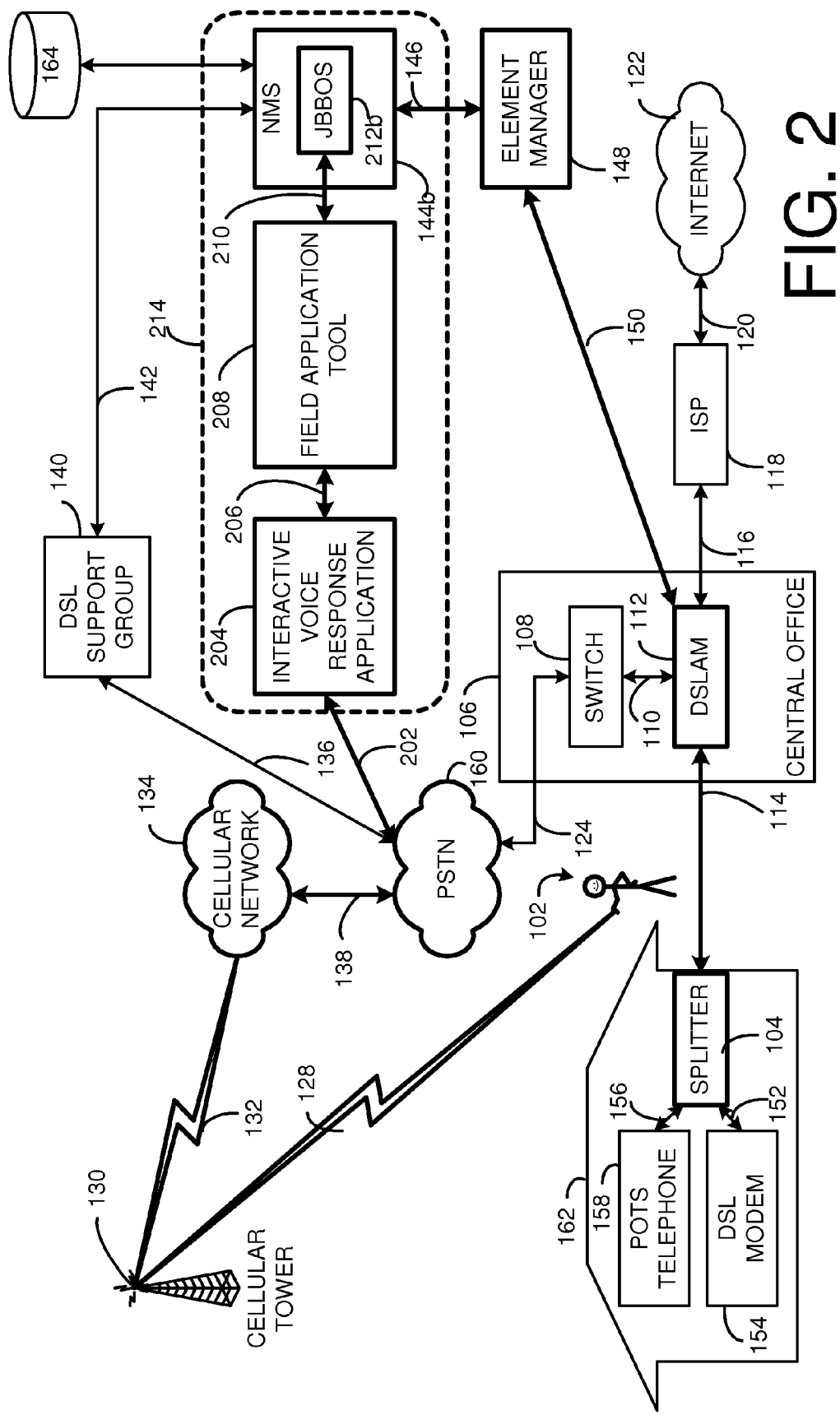
FIG. 2 is a block diagram showing an example communication environment in which there is one embodiment of a system for remotely checking communication lines.

FIG. 2 is a block diagram showing an example communication environment having one embodiment of a system 214 for remotely checking broadband communication components. As shown in FIG. 2, the communication environment includes a public switched telephone network (PSTN) 160, a cellular network 134, and the Internet 122, which are communicatively coupled to each other. Additionally, the communication environment includes a central office 106, which has a switch 108 and a DSL access multiplexer (DSLAM) 112, which are configured to provide DSL services to customers. The switch 108 is coupled to the PSTN 160 through a communication line 124, thereby permitting communications between the PSTN 160 and the central office 106. Since communications between the cellular network 134, the PSTN 160, and the Internet 122 are known in the art, only an abridged discussion is provided below.

A customer location 162, which may be a home, may include both a plain old telephone system (POTS) telephone 158 and a DSL modem 154, thereby permitting both DSL communications and standard telephone services to the customer location 162. A splitter 104 couples the customer location 162 to the DSLAM 112, which is, in turn, coupled to the switch 108. The DSLAM 112 communicatively couples the central office 106 with an Internet service provider 118, thereby permitting access to the Internet 122 for the DSL customers.

While the splitter 104 is shown as a functional block located within the home, it should be appreciated that the splitter 104 may also represent one or more components within the home that properly route the DSL signals and the POTS signals to their respective endpoints (e.g., DSL modem, POTS phone, analog fax machine, etc.). In other implementations, the splitter may represent one or more components located outside of the home, which routes the DSL signals and POTS signals to their respective endpoints. In this regard, it should be appreciated that the splitter 104 may represent the various components used to route the DSL and POTS signals to and from the home and, also, to route DSL and POTS signals to and from the CO. Since many of these configurations are known in the art, further discussion of the splitter 104 is omitted here.

In such an environment, if verification of a DSL port is desired, then a field technician 102 may be deployed to the customer location 162. The customer location 162 may be a home, various connection points outside of the home, a neighborhood access point, or any other point along the line used for transmission of DSL signals. For example, the test measurements may be taken at the DSLAM, at a cross-box located outside of the home, the network interface device (NID), or any point within the home. Upon arriving at the customer location, the field technician 102 connects test equipment to the appropriate line components and calls an automated interactive system 214 in order to verify the DSL port. The test equipment may include, for example, a copper loop testing module such as an ADSL digital test set provided by various manufacturers. The automated interactive system 214 includes an Interactive Voice Response Application (IVR application) 204 and a field application tool 208. The IVR application 204 receives the call from the field technician 102. This call may be placed using a cellular telephone (as shown in FIG. 2) or using a standard POTS phone. In some embodiments, upon reaching the IVR application 204, the field technician 102 is presented with instructions and a list of options selectable by the field technician 102 using the numeric keypad on the field technician's telephone.

When the field technician 102 selects one of the options, the IVR application 204 transmits a signal indicative of the selected option to the field application tool 208. The field application tool 208 converts the received signal into a request that is recognizable by the network management system (NMS) 144b.

The NMS 144b, in turn, accesses the relevant information from an element database 164 and, with the accessed information, affects an element manager 148 to generate commands to the DSLAM 112. In response to the commands, the DSLAM 112 cycles a signal on the line that is detectable by the field technician's test equipment. In some embodiments, the IVR application options may include the option to speak with a support technician at a DSL support group 140. This permits the field technician 102 to perform a test that is not provided for by the options presented by the IVR application 204 by connecting the field technician 102 with a support technician.

Since many routine tests can be performed by the automated interactive system 214, the support technician's time and resources are typically allocated for tasks that are unavailable through the automated interactive system 214. In this regard, system resources are more efficiently utilized.

Several embodiments related to the remote line checking are described in greater detail below with reference to FIGS. 3 through 15.

Figure 3:
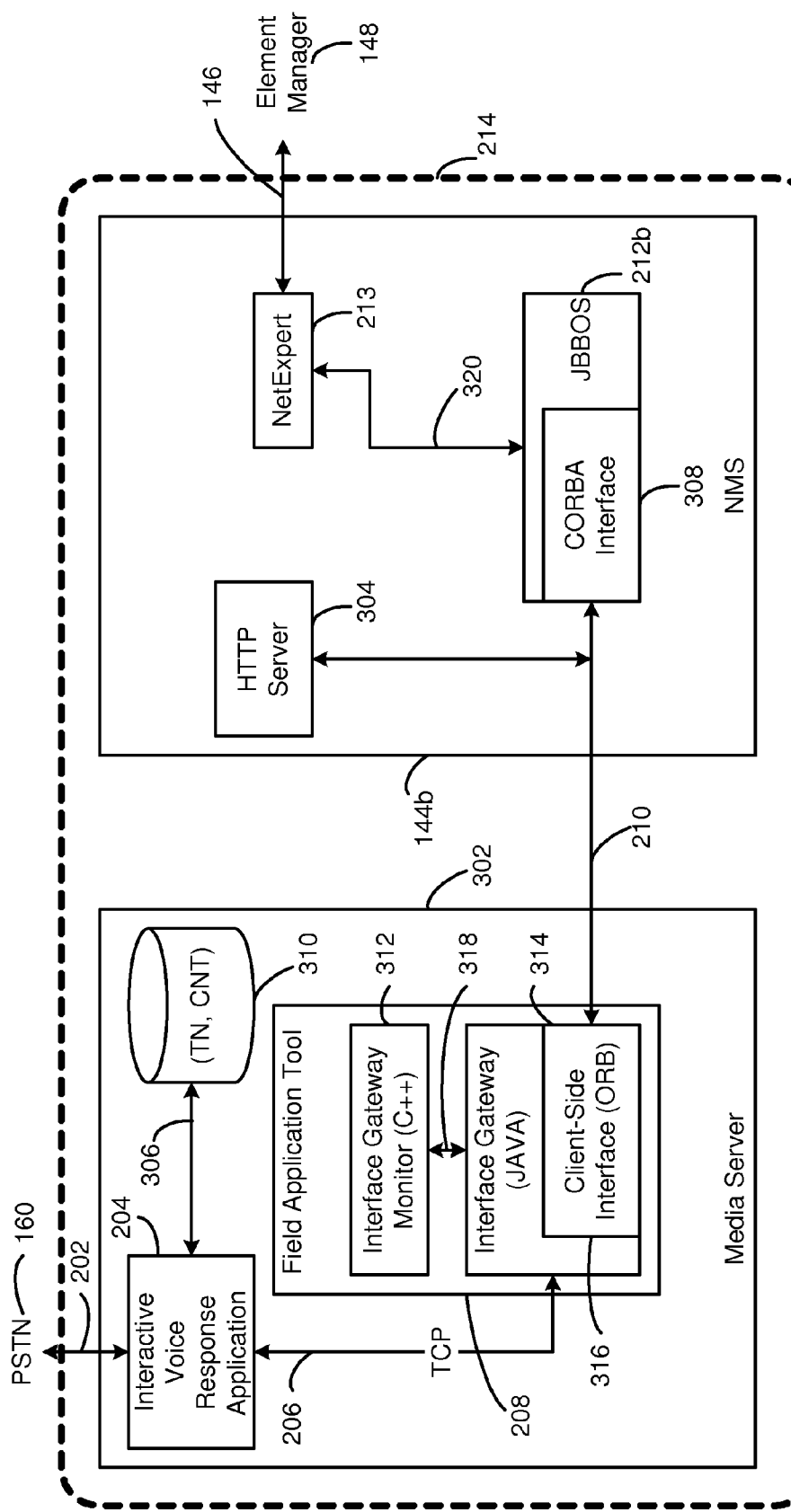
FIG. 3 is a block diagram showing an embodiment of a system for remotely checking communication lines.

FIG. 3 is a block diagram showing an embodiment of an automated interactive system 214 for remotely checking communication lines. As described with reference to FIG. 2, the IVR application 204 provides a user interface to the automated interactive system 214, and the field application tool 208 provides an interface between the IVR application 204 and the NMS 144*b*. This type of architecture provides a mechanism by which a field technician 102 may perform field testing of a communication line without any assistance from a support technician. The following description provides embodiments of system components related to the field application tool 208, and their interaction with both the IVR application 204 and the NMS 144*b*.

In some embodiments, the NMS 144*b* is a pre-existing system that comprises a number of internal components including NetExpert® 213, which is a component from Objective Systems Integrators (OSI)/Agilent Technologies responsible for communicating with the element manager, Java™ broadband operating system (JBBOS) 212*b*, which includes a graphical user interface (GUI), and an HTTP server 304. Communication between NMS components is generally based on common object request broker architecture (CORBA). As described above, the NMS 144*b* is configured to issue requests to the element manager 148 through NetExpert® 213, thereby affecting the communication line. For such embodiments, interactions with the NetExpert® 213 preferably takes place over a communication channel 320 that is CORBA compatible. Hence, the NMS 144*b* may be seen as having a CORBA interface 308 through which communications take place with the NMS 144*b*. In the embodiment of FIG. 3, the NMS 144*b* includes a hyper-text transfer protocol (HTTP) server 304, thereby permitting Internet protocol-based communications with the NMS 144*b*. Hence, the CORBA interface 308 may conceptually be seen as being a component of a Java™ broadband operating system (JBBOS) 212*b*.

In some embodiments, the field application tool 208 is a Java™-based application, which provides greater portability to multiple different platforms. In the embodiment of FIG. 3, the field application tool 208 resides on a media server 302. For Java™-based embodiments, the field application tool 208 includes an interface gateway 314 that has a client-side interface (via object request broker (ORB)) 316 to the JBBOS 212*b* component of the NMS 144*b*. The interface gateway 314 implements the JBBOS 212*b* client functionality from the media server 302 through the ORB 316. Additionally, interface gateway 314 provides an interface to the IVR application 204 using a transmission control protocol/Internet protocol (TCP/IP) 206. In addition to interface gateway 314, the field application tool 208 includes an interface gateway monitoring process 312, simply referred to herein as monitor 312, which implements a set of functions that allow interface gateway 314 to interface with a startup process (not shown) on the media server 302. Since the startup process and its corresponding functions are known in the art, further discussion of the startup process is omitted here. However, it should be appreciated that monitor 312 provides the mechanisms for controlling the processes associated with interface gateway 314 during startup. Preferably, monitor 312 is written in C++. The startup processes are described in greater detail below.

In the embodiment of FIG. 3, the IVR application 204 also resides on the media server 302. However, it should be appreciated that the IVR application 204 may reside on a separate server from the field application tool 208. In any event, the IVR application 204 is coupled to the PSTN 160, thereby providing an interface to field technicians 102 who may call into the automated interactive system 214. Since IVR applications are known in the art, only a truncated discussion of IVR applications is provided here.

The automated interactive system 214 further includes a database 310 that tracks testing of the line by the field technicians. Hence, each time a field technician performs a test on a particular line, the record of the test is logged by the database 310. This is discussed in greater detail with reference to FIGS. 4 through 15.

The initialization process related to interface gateway 314 is described in order to provide a framework for the operating environment of interface gateway 314.

Upon startup by the startup process, monitor 312 starts an instance of interface gateway 314 on the media server 302. The monitor 312 also monitors the processes of interface gateway 314 and posts alarms, if necessary, in the event of errors or failures.

Upon initialization, and upon starting the instance of interface gateway 314 on the media server 302, interface gateway 314 attempts to obtain an NMS session manager object (not shown) from JBBOS 212*b*. The NMS session manager object manages the session between interface gateway 314 and JBBOS 212*b*. In order to ensure proper connection to the NMS session manager object, a session monitor object (not shown) is started in a separate thread. The session monitor object invokes a keepAlive( ) method on the remote NMS session manager object to ensure proper initialization of the communication channel 210 between JBBOS 212*b* and interface gateway 314. In other words, the keepAlive( ) determines the validity of the NMS session manager object. If the keepAlive( ) fails, then the NMS session manager object is determined to be an invalid object, and monitor 312 reinitializes the startup of interface gateway 314. If the keepAlive( ) succeeds, then the NMS session manager object is determined to be a valid object. The determination of validity permits communications between the ORB 316 of interface gateway 314 and the CORBA interface 308 of JBBOS 212*b*.

Upon successful initialization of the communication channel 210, interface gateway 314 periodically invokes keepAlive( ) to determine the validity of the NMS session manager object. If the periodic keepAlive( ) fails, then monitor 312 reinitializes interface gateway 314. In this regard, the keepAlive( ) provides a mechanism for determining the integrity of the connection between the field application tool 208 and the NMS 144*b*.

Since other methods invoked during startup are known in the art, further discussion of the startup process is omitted here. It should, however, be appreciated that monitor 312 permits initialization of interface gateway 314, which, in turn, provides a client-side interface 316 to the CORBA interface 308 of the NMS 144*b*.

Having discussed the initialization process related to interface gateway 314, the operation of interface gateway 314 is discussed below.

Once the proper communication channels 210, 206 have been established with the IVR application 204 and the NMS 144*b*, interface gateway 314 functions as the interface between the IVR application 204 and the NMS 144*b*. In this regard, when the IVR application 204 relays requests to interface gateway 314 using TCP/IP 206, the relayed requests are converted to CORBA function calls by interface gateway 314. The CORBA function calls are then conveyed by the client-side interface 316 of interface gateway 314 to the CORBA interface 308 of the NMS 144*b*. If the function call is valid, then the NMS 144*b* executes the function and relays a success indication back to interface gateway 314, which, in turn, provides a success indication to the IVR application 204 to convey to the field technician 102. If the function call fails for any reason, then a failure message is provided by interface gateway 314 to the IVR application 204, which is relayed back to the field technician 102.

As shown with reference to FIG. 3, the automated interactive system 214 permits access to the NMS 144b by a field technician 102 without occupying time or resources of a support technician, thereby reducing inefficiencies present in prior systems. Having described system components related to embodiments of the automated interactive system 214, attention is turned to FIGS. 4 through 15, which provide embodiments of processes for remotely checking communication lines. It should be appreciated that the processes of FIGS. 4 through 15 may be performed in the systems of FIGS. 2 and 3 or, alternatively, in other automated interactive systems that provide an interface between a field technician 102 and an NMS 144b.

Figure 4:
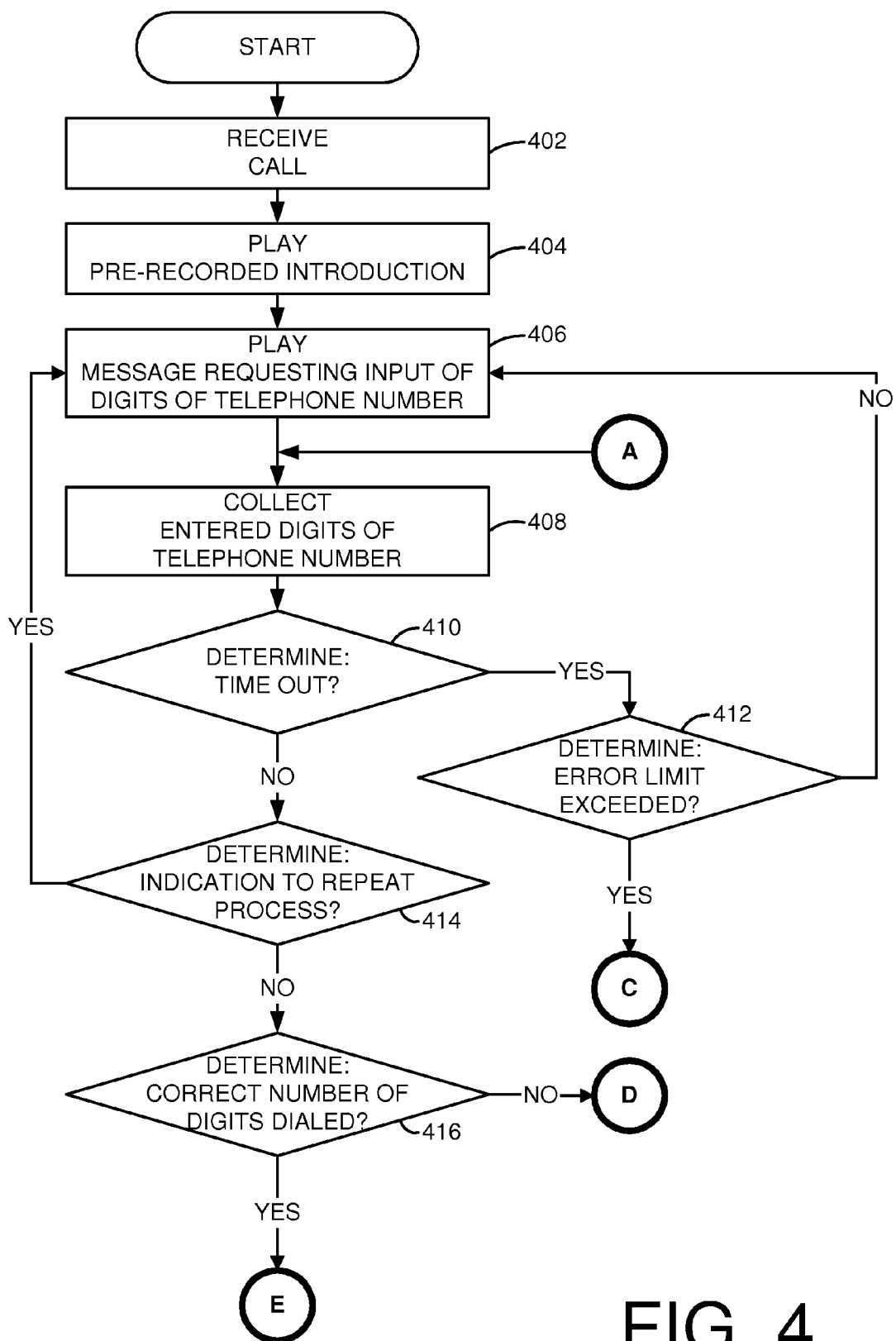

The process begins when a field technician 102 places a call to the automated interactive system 214. Thus, as shown in FIG. 4, the process begins when the automated interactive system 214 receives (402) the call from the field technician 102. In some embodiments, upon receiving (402) the call, a pre-recorded introduction is played (404). This introduction may include a message that indicates that the field technician 102 (or other caller) has reached the automated interactive system 214. Upon playing (404) the pre-recorded introduction, the automated interactive system 214 plays (406) a message requesting that the field technician 102 input digits of a telephone number that the field technician is currently testing. In some embodiments, the message may require the field technician 102 to enter a ten-digit telephone number, which includes the area code. In other embodiments, the message may require only the seven digits in the absence of the area code. Alternative embodiments may provide a mechanism to indicate that all digits have been entered (e.g., pressing the "#" key on the field technician's telephone).

As the field technician 102 enters the digits, the automated interactive system 214 collects (408) the entered digits of the telephone number. As the automated interactive system 214 collects (408) the entered digits, the automated interactive system 214 determines (410) whether or not the system has timed out before all of the digits have been entered. A time out may occur if the all of the required digits have not been entered within a predetermined, finite period of time. If it is determined (410) that the system has timed out, then the automated interactive system 214 further determines (412) whether or not a predefined error limit has been exceeded. In some embodiments, the predefined error limit may be three attempts at entering a given telephone number. In other embodiments, the predefined limit may be set using different criteria. The predefined error limit may be stored as a value in a database or, alternatively, may be hardwired into the system.

Figure 6:
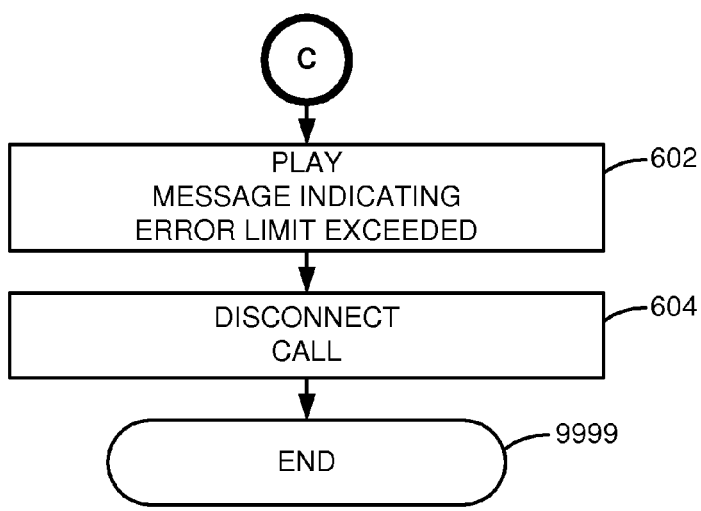

If the predefined error limit has been exceeded, then the process continues to block C in FIG. 6. If, on the other hand, the predefined error limit has not been exceeded, then the process loops back, and the automated interactive system 214 again plays (406) the message requesting input of the telephone number being tested.

Returning to the determination (410) of the time out, if the automated interactive system 214 determines (410) that the system has not timed out, then the automated interactive system 214 determines (414) whether or not the field technician 102 has entered an indication to repeat the process. In some embodiments, the indication to repeat the process may be an entry of the "*" key on the field technician's telephone.

If the field technician 102 has indicated that the process should be repeated (e.g., an indication to start over by pressing "*"), then the automated interactive system 214 again plays (406) the message requesting the input of the telephone number being tested. If, on the other hand, there has been no indication to repeat the process, then the automated interactive system 214 further determines (416) whether or not the correct number of digits have been dialed. For example, if ten digits (including the area code) are required, then the system determines whether or not all ten digits have been dialed; if seven digits are required, then the system determines whether or not all seven digits have been dialed, etc. If the number of digits is incorrect, then the process continues to block D in FIG. 7. If, on the other hand, the number of digits is correct, then the process continues to block E in FIG. 8.

Figure 5:
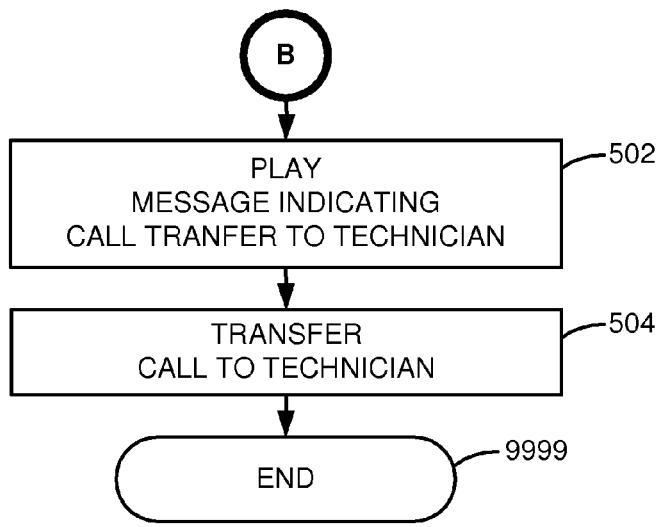

In some embodiments, when any step of the process continues to block B of FIG. 5 (e.g., from FIG. 13, FIG. 14, or FIG. 15), the automated interactive system 214 plays (502) a message indicating that the field technician's call is being transferred to a support technician. For environments in which DSL lines are being checked, such as that shown in FIG. 2, the support technician may be located at a DSL support group 140 that assists field technicians with DSL-related line-checking tasks. Upon playing (502) the message, the automated interactive system 214 transfers (504) the call to the support technician, and terminates (9999) the process.

As shown in FIG. 6, when any step of the process continues to C due to the error limit being exceeded (e.g., from FIG. 4, FIG. 7, FIG. 8, FIG. 9, FIG. 10, FIG. 11, FIG. 13, or FIG. 15), the automated interactive system 214 plays (602) a message indicating that the error limit has been exceeded. As noted above, the error limit, in some embodiments, may be exceeded when three unsuccessful attempts have been made to access a particular telephone number. Upon playing (602) the message indicative of exceeding the error limit, the automated interactive system 214 disconnects (604) and the process terminates (9999).

Figure 7:
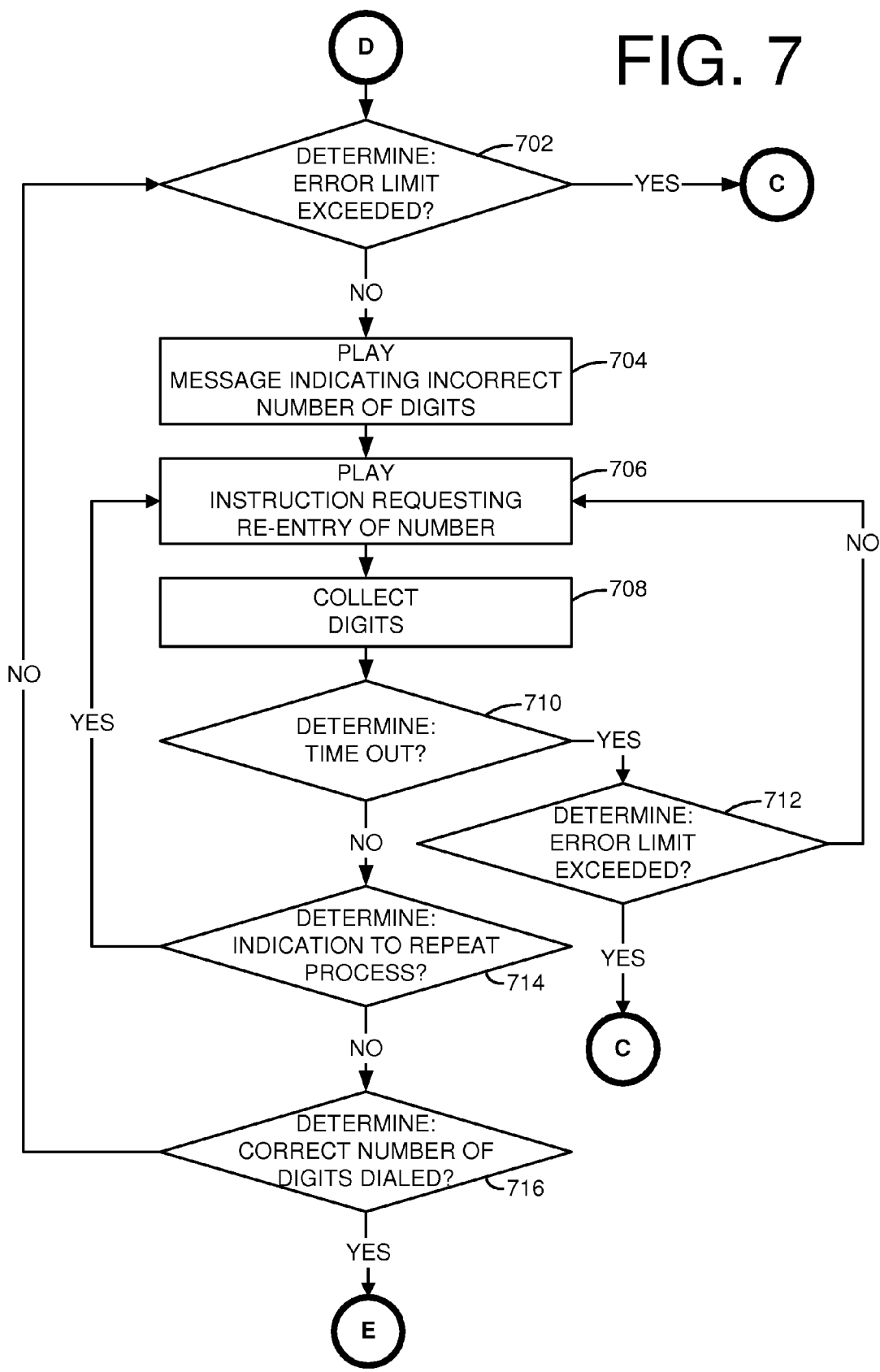

Continuing from block D of FIG. 4 (or from FIG. 11 described below), the automated interactive system 214, in FIG. 7, determines (702) whether or not the error limit has been exceeded. If it is determined (702) that the error limit has been exceeded, then the automated interactive system 214 continues to block C in FIG. 6, which is described above. If, on the other hand, it is determined (702) that the error limit has not been exceeded, then the automated interactive system 214 plays (704) a message indicating that an incorrect number of digits has been dialed. Thereafter, the automated interactive system 214 plays (706) an instruction to the field technician 102, which requests re-entry of the telephone number. When the field technician 102 re-enters the telephone number, the automated interactive system 214 collects (708) the entered digits while, again, determining (710) whether or not the system has timed out. If the system has timed out, then the automated interactive system 214 further determines (712) whether or not the error limit has been exceeded. If the error limit has been exceeded, then the process continues to block C in FIG. 6. If, on the other hand, the error limit has not been exceeded, then the process loops back, and the automated interactive system 214 again plays (706) the instruction requesting the field technician 102 to re-enter the telephone number.

Continuing from the determination (710) of the time out, if the automated interactive system determines (710) that the system has not timed out, then the automated interactive system further determines (714) whether or not the field technician 102 has entered an indication to repeat the process. As noted above, the indication to repeat the process may be an entry of "*" to the field technician's telephone. If the field technician has indicated that the process should be repeated, then the process loops back, and the automated interactive system 214 again plays (706) the instruction requesting re-entry of the telephone number.

If, however, there is no indication to repeat the process, then the automated interactive system 214 further determines (716) whether or not the correct number of digits have been dialed. If the correct number of digits have not been dialed, then the process loops back, and the automated interactive system 214 again determines (702) whether or not the error limit has been exceeded. Conversely, if the correct number of digits have been dialed, then the process continues to block E in FIG. 8.

Figure 8:
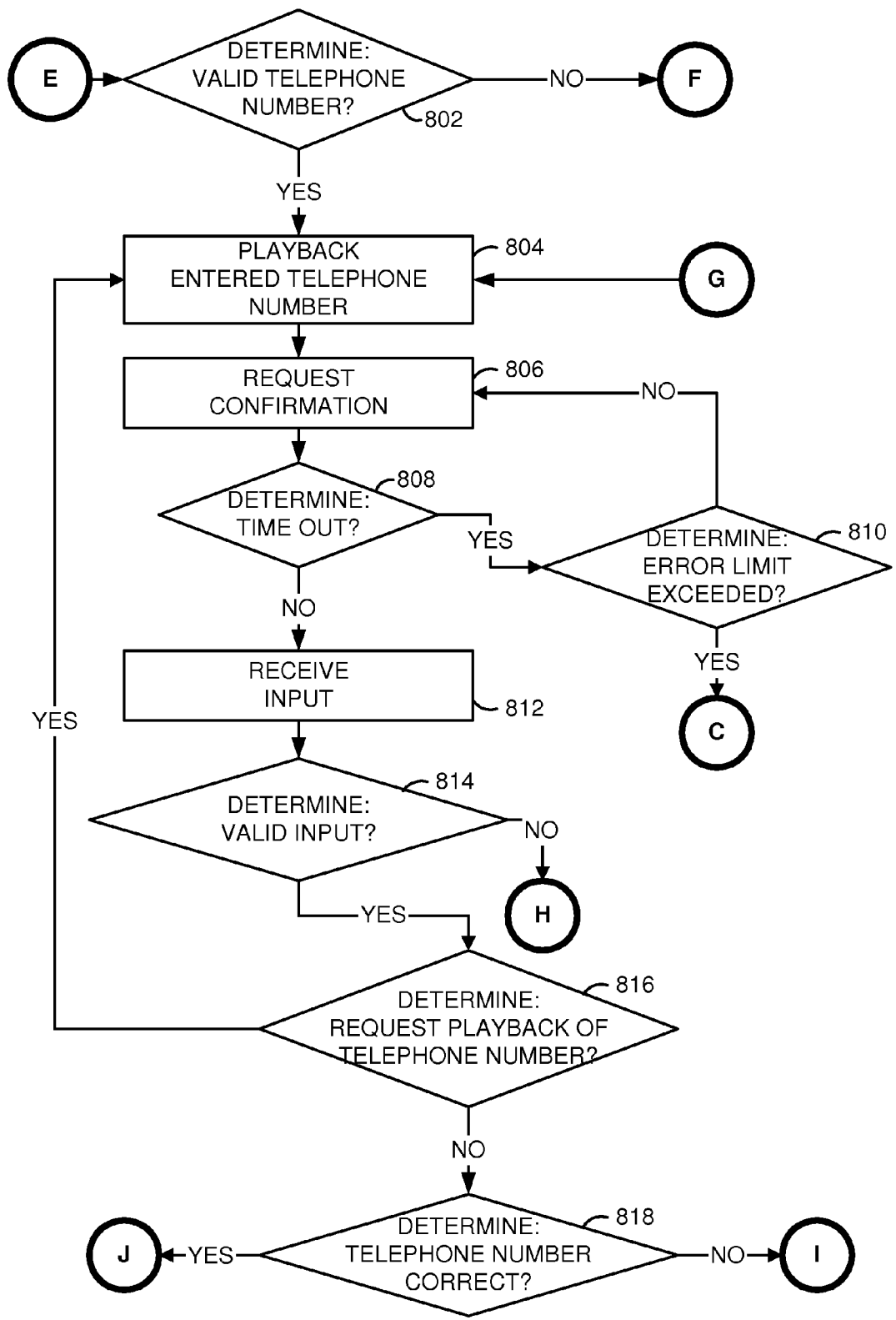
Figure 11:
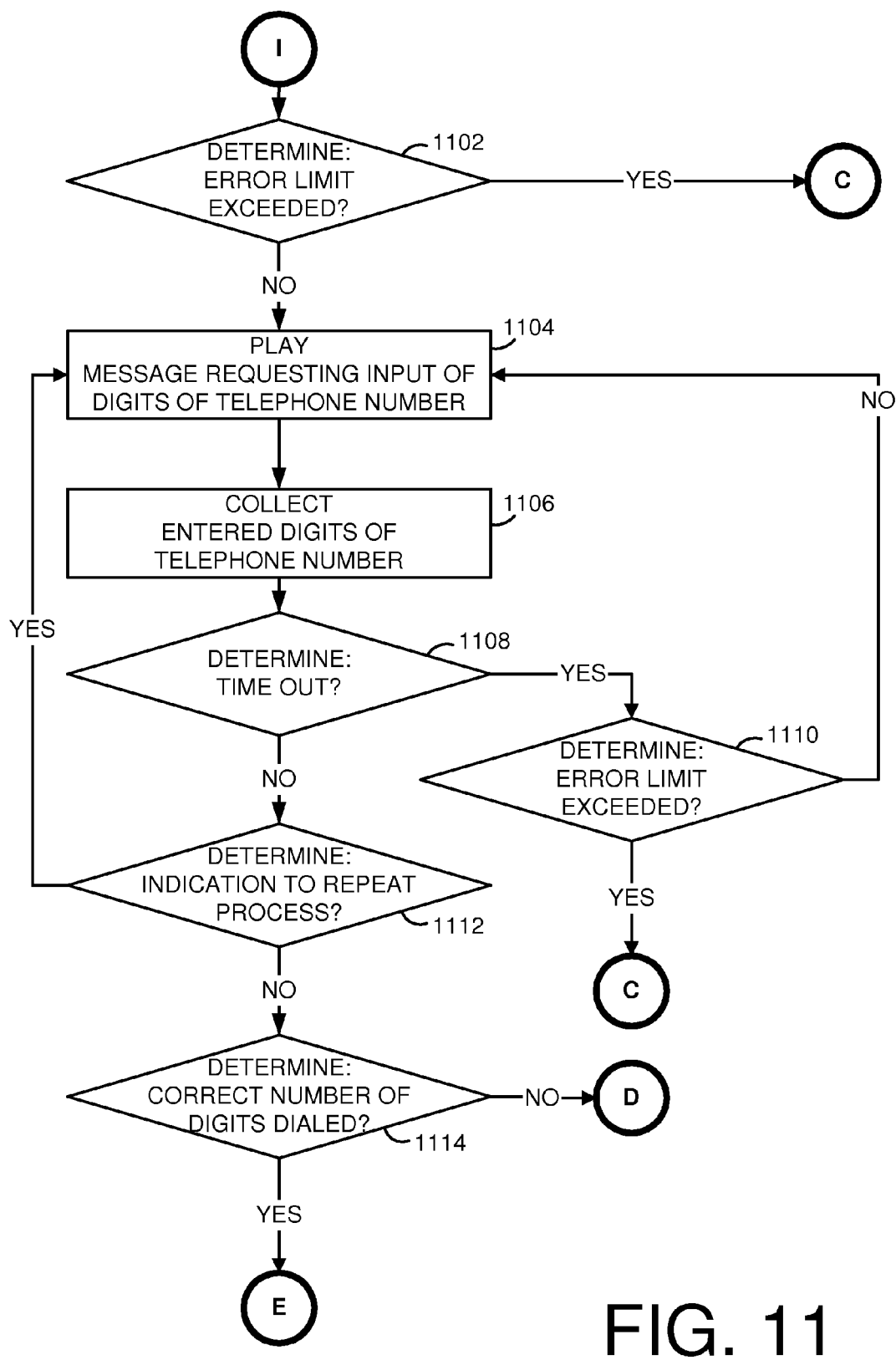

FIG. 8 shows the continuation of the process from any step that branches to block E (e.g., from FIG. 4, FIG. 7, or FIG. 11). As shown in FIG. 8, the automated interactive system 214 determines (802) whether or not the entered telephone number corresponds to a valid telephone number. In some embodiments, this is done by comparing the entered telephone number to a database of valid telephone rules. If the entered telephone number is an invalid number, then the process continues to block F in FIG. 9. If, on the other hand, the entered telephone number is a valid telephone number, then the automated interactive system plays back (804) the entered telephone number and requests (806) confirmation from the field technician 102 (e.g., "please press '1' if the number is correct," etc.). While requesting (806) confirmation, the automated interactive system 214 determines (808) whether or not the system has timed out. If the system has timed out, then the automated interactive system 214 further determines (810) whether or not the error limit has been exceeded. If the error limit has been exceeded, then the process continues to block C in FIG. 6. If, however, the error limit has not been exceeded, then the process loops back, and the automated interactive system 214 again requests (806) confirmation of the telephone number from the field technician 102.

If the field technician 102 provides an input in response to the request (806), the input is received (812) and the automated interactive system 214 determines (814) whether or not the input is a valid input. For example, the automated interactive system 214 may have requested that the field technician 102 input a "1" if the played back (804) number was correct, or that the field technician 102 input a "2" if the played back (804) number was incorrect. In response, the field technician 102 may have entered "6," which would not be valid given the provided options. Then the automated interactive system 214 would determine (814) that an invalid input was provided by the field technician 102 and the process would continue to block H in FIG. 10. Conversely, if the field technician 102 provides a valid input, then the automated interactive system 214 further determines (816) whether or not the valid input is indicative of a request to playback the telephone number (e.g., the field technician enters "*"). If the field technician 102 has requested that the telephone number be replayed, then the process loops back, and the automated interactive system 214 plays back (804) the telephone number.

If the input from the field technician 102 is not a request to repeat the telephone number, then the automated interactive system 214 determines (818) whether or not the input is indicative of a confirmation or a rejection of the played back (804) number. If the field technician 102 has rejected the telephone number, then the process continues to block I in FIG. 11. Conversely, if the field technician has confirmed that the telephone number is correct, then the process continues to block J in FIG. 12.

FIG. 9 shows the continuation of the process from any step that branches to block F (e.g., from FIG. 8). As shown in FIG. 9, the automated interactive system 214 determines (902) whether or not the error limit has been exceeded. If the error limit has been exceeded, then the process, again, continues to block C in FIG. 6. Conversely, if the error limit has not been exceeded, then the automated interactive system 214 plays (904) a message indicating that the entered telephone number is invalid. Thereafter, the automated interactive system plays (906) a message requesting that the field technician 102 re-enter the digits of the telephone number. The process then continues to block A in FIG. 4.

FIG. 10 shows the continuation of the process from any step that branches to block H (e.g., from FIG. 8). In FIG. 10, the automated interactive system 214 determines (1002) whether or not the error limit has been exceeded. If the error limit has been exceeded, then the process continues to block C in FIG. 6. If, on the other hand, the error limit has not been exceeded, then the automated interactive system 214 plays (1004) a message indicating that the input by the field technician 102 is invalid, and the process continues to block G in FIG. 8.

FIG. 11 shows the continuation of the process from any step that branches to block I (e.g., from FIG. 8). As shown in FIG. 11, the automated interactive system 214 determines (1102) whether or not the error limit has been exceeded. If the error limit has been exceeded, then the process continues to block C in FIG. 6. On the other hand, if the error limit has not been exceeded, then the automated interactive system 214 plays (1104) a message requesting that the field technician 102 input the correct digits of the telephone number. As the field technician 102 enters the digits, the automated interactive system 214 collects (1106) the digits and determines (1108) whether or not the system has timed out. If the system has timed out, then the automated interactive system 214 further determines (1110) whether or not the error limit has been exceeded. If the error limit has been exceeded, then the process continues to block C in FIG. 6. Alternatively, if the error limit has not been exceeded, then the process loops back, and the automated interactive system 214 again plays (1104) the message requesting correct entry of the telephone number.

If the system has not timed out during the entry of the telephone number by the field technician 102, then the automated interactive system 214 determines (1112) whether or not the field technician 102 has provided any indication to repeat the process (e.g., input "*" from the field technician's telephone). If the field technician 102 has requested to restart (or repeat) the process, then the automated interactive system 214 loops back and plays (1104) the message requesting the entry of the telephone number.

If the field technician 102 has entered the telephone number without requesting to restart the process, then the automated interactive system 214 determines (1114) whether or not the correct number of digits have been dialed. If the correct number of digits have been dialed, then the process continues to block E as described above in FIG. 8. Conversely, if an incorrect number of digits have been dialed, then the process continues to block D as described above in FIG. 7.

Figure 12:
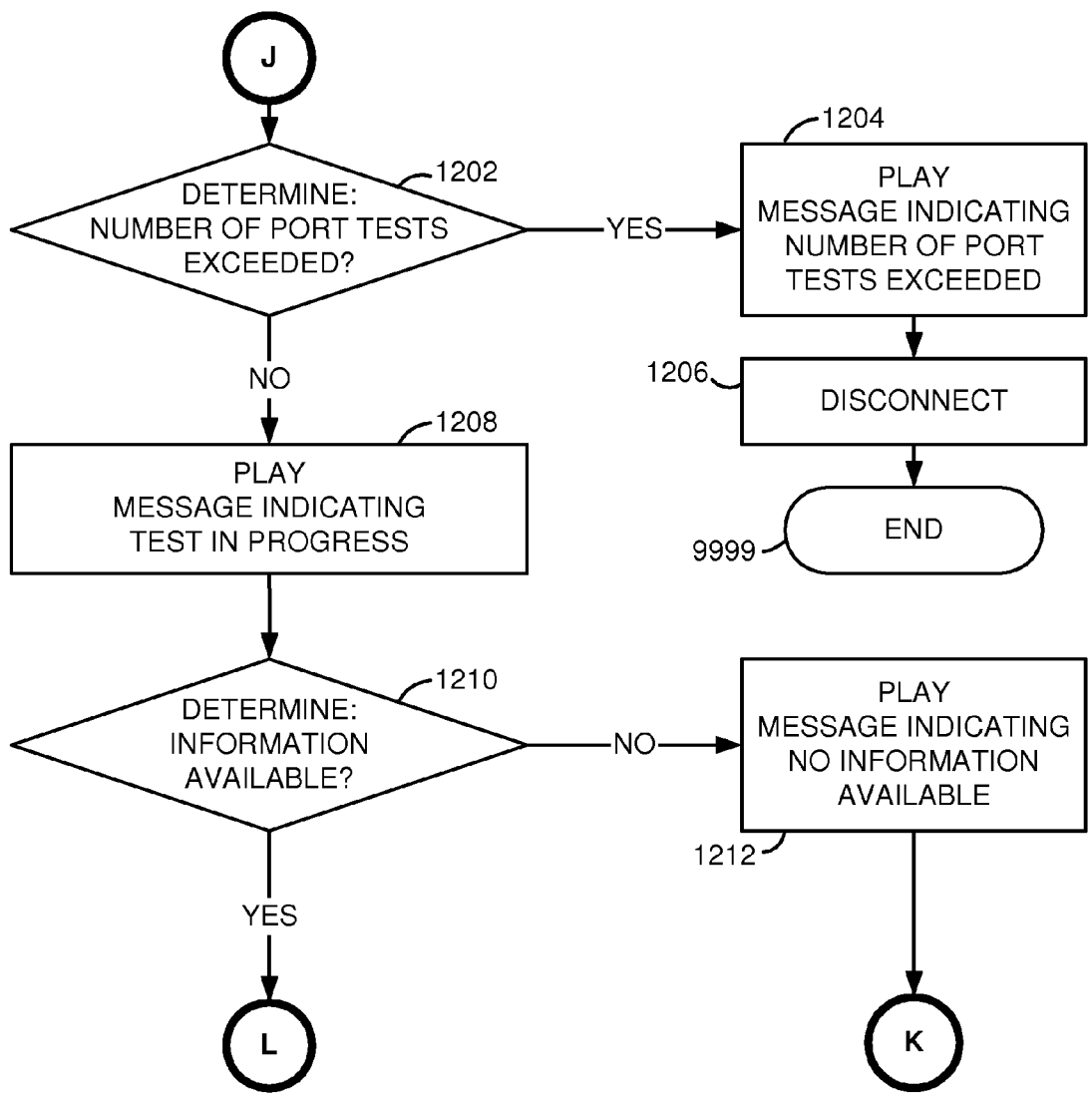

FIG. 12 is a flowchart showing an embodiment of the process in the event that a proper telephone number has been entered. The process of FIG. 12 may be seen as a continuation from block J of FIG. 8. Specifically, FIG. 12 shows a process in which a field technician 102 requests a port test associated with a particular telephone number. However, it should be appreciated that the invention is not limited only to port testing, but may be extended to any type of broadband service checking. As shown in FIG. 12, the automated interactive system 214 determines (1202) whether or not a predetermined number of port tests have been exceeded on the given telephone number for the day. In some embodiments, this is implemented in order to provide greater security since it is undesirable to permit an infinite number of port tests on a single telephone number, thereby occupying the telephone number with port tests and preventing broadband use of the telephone number. In some embodiments, the number of port tests and their corresponding telephone numbers are stored on a database 310 coupled to the IVR application 204 of the automated interactive system 214. This database 310 may be updated each time a test is performed on a particular line. Additionally, the predetermined limit may be reset on a daily basis or at other predefined intervals.

If the predetermined number of port tests has been exceeded, then the automated interactive system 214 plays (1204) a message to the field technician 102, which indicates that the allowable number of port tests has been exceeded for the entered telephone number. Thereafter, the automated interactive system 214 disconnects (1206) the field technician 102, and the process terminates (9999). Alternatively, if the predetermined number of port tests has not been exceeded, then the automated interactive system 214 plays (1208) a message to the field technician 102 to indicate that the requested port test is in progress.

Upon playing (1208) the message (or concurrently as the message is playing (1208)), the automated interactive system 214 determines (1210) whether or not information on the requested telephone number is available. In some embodiments, this is performed by interface gateway 314, which requests this information from the NMS 144b, which in turn accesses the element database 164 for this information. Since the communications protocols between the IVR application 204, interface gateway 314, and the NMS 144b are described above, further discussion of the communications protocols is omitted here.

Figure 13:
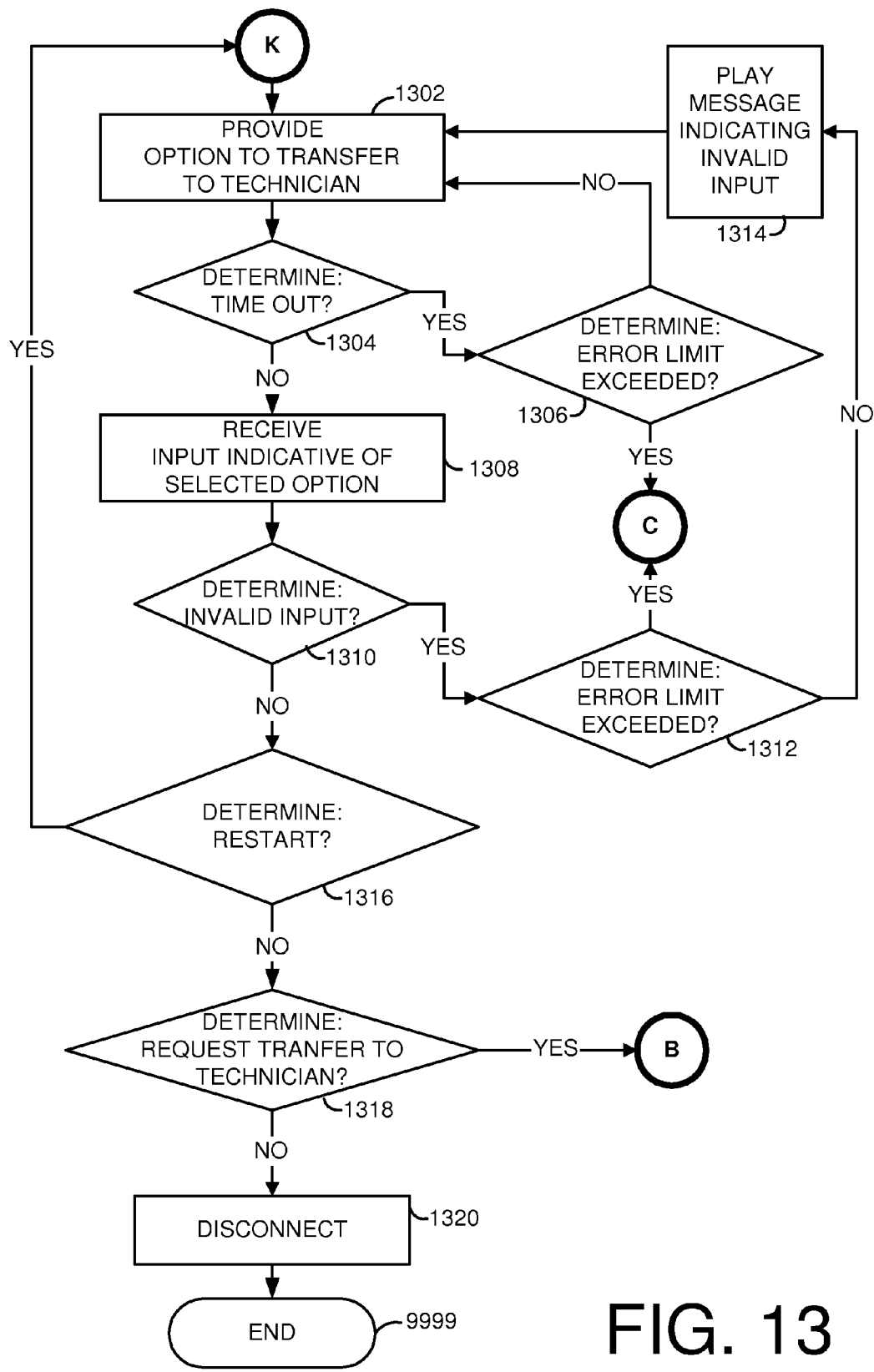

If the automated interactive system 214 determines (1210) that no information is available (e.g., receives an indication that no information is available), then a message is played (1212b) to the field technician 102, which indicates that no information is available, and the process continues to block K in FIG. 13. On the other hand, if information on the requested telephone number is available, then the process continues to block L in FIG. 14.

FIG. 13 is a flowchart showing an embodiment of the process in the event that information is unavailable for a requested telephone number. In this regard, FIG. 13 may be a continuation of any process that branches to block K (e.g., from FIG. 12). As shown in FIG. 13, when no information is available for a requested telephone number, then the automated interactive system 214 provides (1302) an option for the field technician to have the call transferred to a support technician. As described above, the support technician may be located at the DSL support group 140 in environments that support DSL communications. Upon providing (1302) the option, the automated interactive system 214 awaits an input from the field technician 102 and, during this period, determines (1304) whether or not the system has timed out. If the system has timed out, then the automated interactive system 214 further determines (1308) whether or not the error limit has been exceeded. If the error limit has been exceeded, then the process continues to block C in FIG. 6. If the error limit has not been exceeded, then the process loops back, and the option to transfer is again provided (1302) to the field technician 102.

If the system has not timed out, and the field technician 102 has provided an input, then the automated interactive system 214 receives (1304) the input from the field technician 102 and determines (1310) whether or not the input represents a valid option. If the input represents an invalid option, then the automated interactive system 214 further determines (1312) whether or not the error limit has been exceeded. If the error limit has been exceeded, then the process continues to block C in FIG. 6. If the error limit has not been exceeded, then the automated interactive system 214 plays (1314) a message indicating that the input by the field technician 102 is invalid, and again provides (1302) the option (e.g., prompts the field technician) to transfer to a support technician.

If the input from the field technician is a valid option, then the automated interactive system determines (1316) whether or not the field technician 102 has requested a restart of the process. If the field technician 102 has requested a restart (e.g., the field technician has pressed the "*" key on the numeric keypad of his telephone), then the process continues to block K. If the field technician 102 has not requested a restart, then the automated interactive system 214 determines (1318) whether or not the field technician 102 has requested a transfer to a support technician. If the field technician 102 has requested a transfer to a support technician, then the process continues to block B in FIG. 5. Conversely, if the field technician 102 has not requested a transfer to a support technician, then the automated interactive system 214 disconnects (1320) the field technician 102 since there is nothing further that the system can do with the request from the field technician 102. Thereafter, the process terminates (9999).

Figure 14:
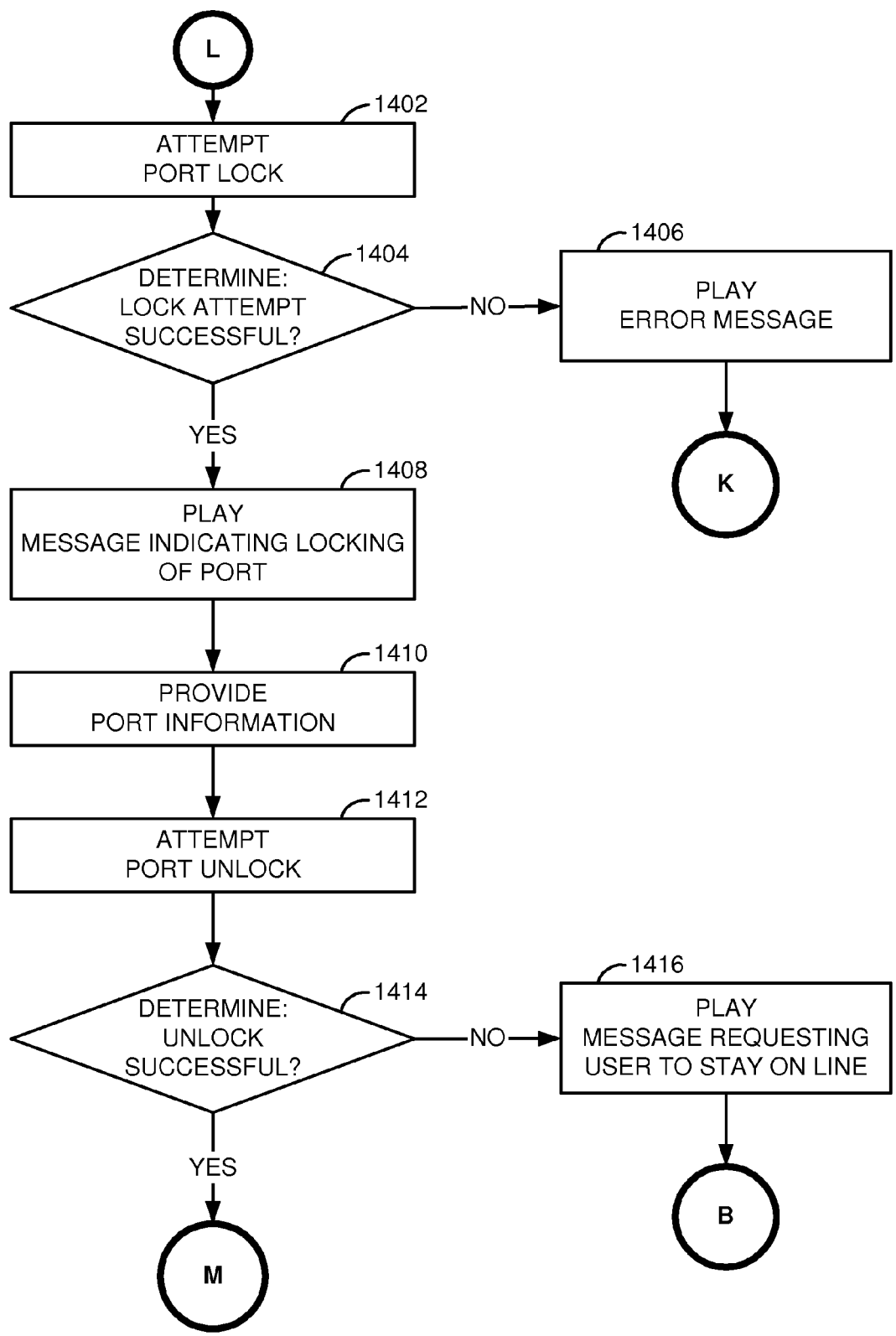

FIG. 14 is a flowchart showing one embodiment of the process in which the field technician 102 has requested port verification for a particular telephone number. As such, the embodiment of FIG. 14 may be seen as a continuation of the process from any step that branches to block L (e.g., from FIG. 12). Once the correct information has been obtained, the automated interactive system 214 attempts (1402) to lock the port associated with the provided telephone number (e.g., requests a port lock on the provided telephone number). As is known in the art, the locking of the port prevents the receiving or transmitting of data over the locked port. Thereafter, the automated interactive system 214 determines (1404) whether or not the attempt (1402) was successful. If the attempt (1402) failed, then the automated interactive system 214 plays (1406) an error message indicating the failure, and the process continues to block K in FIG. 14.

If the attempt (1402) is successful, and the port is locked, then the automated interactive system 214 plays (1408) a message indicating the locking of the port. Additionally, the automated interactive system 214 provides (1410) port information on the locked port to the field technician 102. Thereafter, the automated interactive system 214 attempts (1412) to unlock the locked port (e.g., requesting an unlock), after a configurable delay time of, for example, 30 seconds. If the attempt (1412) to unlock the port has failed, then the automated interactive system 214 plays (1416) a message requesting the field technician 102 (or other user) to stay on the phone. Upon playing (1416) the message, the process continues to block B in FIG. 5, where the automated interactive system 214 transfers the field technician 102 to a support technician. The reason for the transfer is because, once the port is locked and cannot be unlocked, the port associated with the telephone number is inoperable to transmit and receive data. In other words, the port, once locked, prevents regular communications through the port. If the attempt (1412) to unlock the locked port is successful, then the process continues to block M in FIG. 15.

Figure 15:
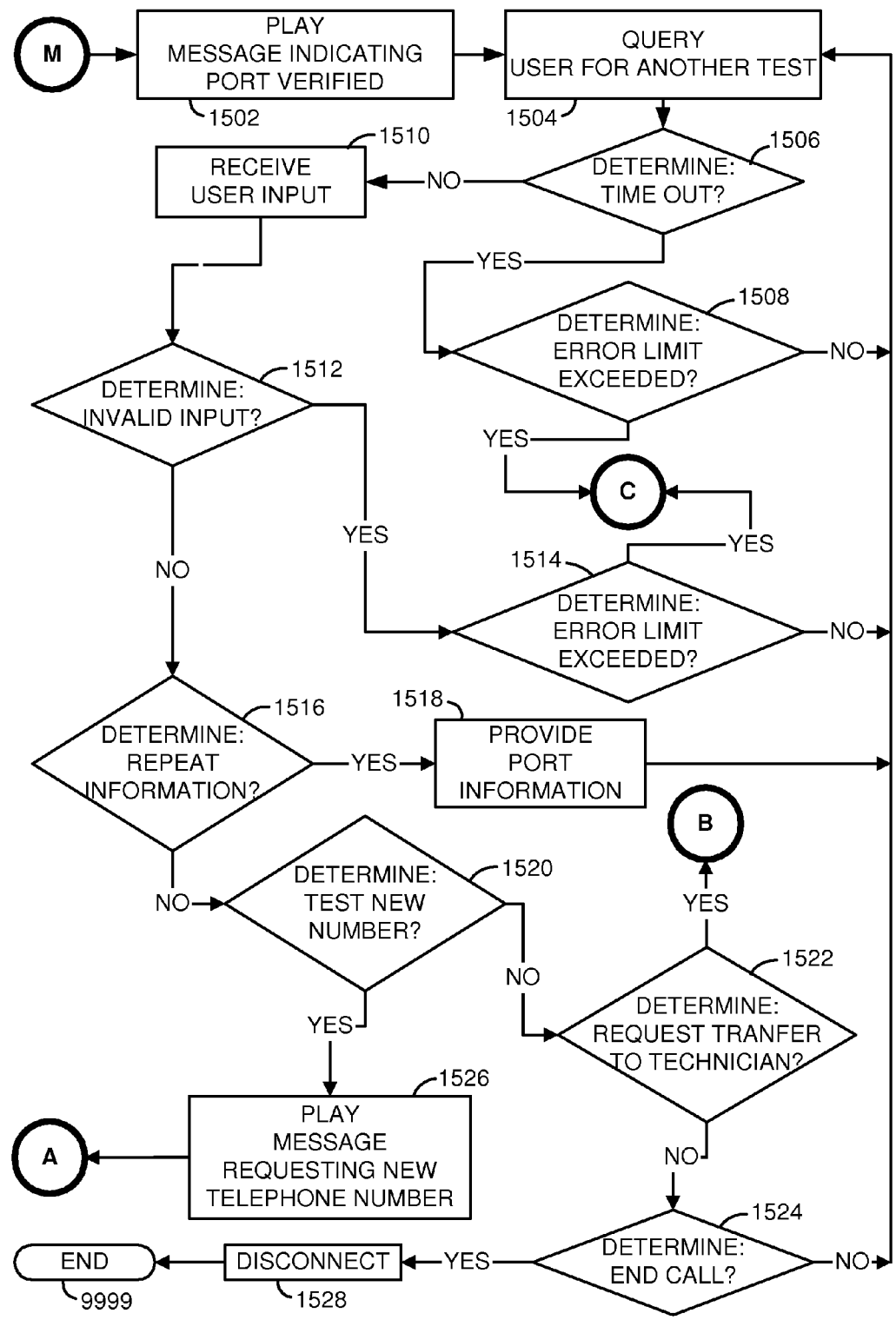

FIG. 15 is a flowchart showing an embodiment in which a port verification process is successful. In this regard, FIG. 15 may be seen as a continuation of the process from block M of FIG. 14. Once the port has been successfully locked and unlocked, as shown in FIG. 14, the automated interactive system 214 plays (1502) a message to the field technician 102 indicating that the port has been successfully verified. Thereafter, the automated interactive system 214 queries (1504) the field technician 102 to determine whether or not another check should be performed. In some embodiments, the query may provide options that are selectable by the field technician 102 using the field technician's telephone. Upon querying (1504), the automated interactive system awaits an input from the field technician 102 while determining (1506) whether or not the system has timed out. If the system times out prior to any input by the field technician 102, then the automated interactive system 214 further determines (1508) whether or not the error limit has been exceeded. If the error limit has been exceeded, then the process continues to block C in FIG. 6. If the error limit has not been exceeded, then the process loops back, and the automated interactive system 214 again queries (1504) the field technician 102 for an input.

When the field technician 102 provides an input, the automated interactive system 214 receives (1510) the input and determines (1512) whether or not the input is valid. For example, if options were provided to the field technician 102 (e.g., press "1" to repeat the port information, press "2" to test another telephone number, press "3" to transfer to a support technician, press "4" to end the port verification process, etc.), and the field technician provides an input that is not included in the provided options (e.g., the field technician 102 has pressed "8"), then the automated interactive system 214 further determines (1514) whether or not the error limit has been exceeded. If the error limit has been exceeded, then the process continues to block C in FIG. 6. Conversely, if the error limit has not been exceeded, then the process loops back, and the automated interactive system 214 again queries (1504) the field technician for an input.

If the input from the field technician 102 is valid, then the automated interactive system 214 further determines (1516) whether the field technician 102 has requested a repeat of the port information (e.g., the field technician 102 has pressed "1"). If the field technician 102 has requested a repeat of the port information, then the automated interactive system provides (1518) the port information, and the process loops back so that the field technician 102 may again be queried (1504) for an input.

If the field technician 102 has not requested a replay of the port information, then the automated interactive system 214 determines (1520) whether or not the field technician 102 has requested testing of a new telephone number (e.g., the field technician 102 has pressed "2"). If the field technician 102 has requested a new telephone number, then the automated interactive system 214 plays (1526) a message requesting the field technician 102 to enter the new telephone number, and the entire process repeats from block A.

Conversely, if the field technician 102 has not requested testing of a new telephone number, then the automated interactive system 214 determines (1522) whether or not the field technician 102 has requested a transfer to a support technician (e.g., the field technician 102 has pressed "3"). If the field technician 102 has requested that the call be transferred to a support technician, then the process continues to block B in FIG. 5. If, however, the field technician 102 has not requested that the call be transferred, then the automated interactive system 214 further determines (1524) whether or not the field technician 102 has completed the port verification.

If the automated interactive system 214 determines (1524) that the field technician 102 has completed the port verification process (e.g., the field technician 102 has pressed "4"), then the automated interactive system 214 disconnects (1528) the field technician 102 and terminates (9999) the process. Alternatively, if the field technician has not completed the port verification process, then the process loops back, and the automated interactive system 214 again queries (1504) the field technician 102 for an input.

As seen from the processes described with reference to FIGS. 4 through 15, the automated interactive system 214 provides an efficient mechanism by which a field technician 102 may check a communication line (e.g., verify a DSL port, retrieve port information, etc.) without occupying the time or resources of a support technician. In this regard, embodiments of the systems and processes shown in FIGS. 2 through 15 result in a more efficient approach to checking communication lines.

The automated interactive system 214, and all of its related processes, can be implemented in hardware, software, firmware, or a combination thereof. In the preferred embodiment(s), the automated interactive system 214, and all of its related processes, is implemented in software or firmware that is stored in a memory and that is executed by a suitable instruction execution system. If implemented in hardware, as in an alternative embodiment, the field application tool 208 can be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Any process descriptions or blocks in flow charts should be understood as representing modules, segments, or portions of code which include one or more executable instructions for implementing specific logical functions or steps in the process, and alternate implementations are included within the scope of the preferred embodiment of the present invention in which functions may be executed out of order from that shown or discussed, including substantially concurrently or in reverse order, depending on the functionality involved, as would be understood by those reasonably skilled in the art of the present invention.

The interface gateway 314, the monitor 312, the field application tool 208, and their related components, which comprises an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer-readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

Although exemplary embodiments have been shown and described, it will be clear to those of ordinary skill in the art that a number of changes, modifications, or alterations may be made, none of which depart from the spirit of the present invention. For example, while DSL line verification processes have been described in great detail, it should be appreciated that any type of request relating to the checking of broadband communication lines may be performed by the above-described systems and methods. Additionally, the disclosed embodiments may be used simply to request information on a particular communication line without actually placing a signal on the line. For example, information on the status of a port may be obtained from the NMS 144b without affecting the operation of the port itself. All such changes, modifications, and alterations should therefore be seen as within the scope of the present invention.

What is claimed is:

1. A method comprising:
receiving a digital request from an Interactive Voice Response Application, the digital request being received using a transmission control protocol/Internet protocol, the digital request comprising at least one of a request to verify a digital subscriber line port, a request to condition the digital subscriber line port or a request to retrieve information on the digital subscriber line port;
translating the digital request into a common object request broker architecture compatible request; and
conveying the common object request broker architecture compatible request to a network management system to cause the network management system to configure a digital subscriber line access multiplexer associated with the digital subscriber line port in response to the common object request broker architecture compatible request.

2. A system comprising:
an Interactive Voice Response module communicatively coupled to a public switched telephone network, the Interactive Voice Response module to receive an input from a field technician over the public switched telephone network and to generate a digital request corresponding to the received input;
a field application tool to translate the digital request into a common object request broker architecture compatible request;
a digital subscriber line access multiplexer; and
a network management system to generate a command in response to the common object request broker architecture compatible request and to transmit the command to the digital subscriber line access multiplexer to configure the digital subscriber line port corresponding to the received input.

3. A method as defined in claim 1, wherein the digital subscriber line access multiplexer is to transmit a test signal detectable on the digital subscriber line port in response to the configuration.

4. A method as defined in claim 1, further comprising:
receiving a common object request broker architecture response from the network management system, the common object request broker architecture response including response information provided by the digital subscriber line access multiplexer in response to the configuration; and
conveying the response information contained in the common object request broker architecture response to the Interactive Voice Response Application.

5. A method as defined in claim 1, wherein the digital request includes an identifier associated with the digital subscriber line port.

6. A system as defined in claim 2, wherein the digital subscriber line access multiplexer is to transmit a test signal detectable on the digital subscriber line port in response to the command.

7. A system as defined in claim 2, wherein:
the digtal subscriber line access multiplexer is to provide response information to the network management system in response to the command;
the network management system is to generate a common object request broker architecture response including the response information and to send the common object request broker architecture response to the field application tool;
the field application tool is to translate the common object request broker architecture response into a response message and to send the response message to the Interactive Voice Response module; and
the Interactive Voice Response Application module is to translate the response information contained in the response message into a humanly-intelligble audio signal and to present the humanly-intelligble audio signal to the field technician via the public switched telephone network.

8. A tangible article of manufacture storing machine-readable instructions that, when executed, cause a machine to at least:
receive a digital request from an interactive voice response module, the digital request being received using a transmission control protocol/Internet protocol, the digital request comprising at least one of a request to verify a digital subscriber line port, a request to condition the digital subscriber line port; and or a request to retrieve information on the digital subscriber line port;
translate the digital request into a common object request broker architecture compatible request; and
convey the common object request broker architecture compatible request to a network management system to cause the network management system to configure a digital subscriber line access multiplexer associated with the digital subscriber line port in response to the common object request broker architecture compatible request.

9. An article of manufacture as defined in claim 8, wherein the machine-readable instructions, when executed, further cause the machine to:
receive a common object request broker architecture response from the network management system, the common object request broker architecture response including response information provided by the digital subscriber line access multiplexer in response to the configuration; and
convey response information contained in the common object request broker architecture response to the interactive voice response module.

10. An article of manufacture as defined in claim 8, wherein the digital request includes an identifier associated with the digital subscriber line port.

* * * * *